United States Patent [19]

Case, Jr. et al.

[11] Patent Number: 5,825,350
[45] Date of Patent: Oct. 20, 1998

[54] ELECTRONIC POINTING APPARATUS AND METHOD

[75] Inventors: Charles Whipple Case, Jr., Palo Alto; Torbjorn Hovden, San Jose; Gregory Clark Smith, La Honda; Steven Porter Hotelling, Cupertino; Michael Kenneth Sabina, Menlo Park, all of Calif.

[73] Assignees: Gyration, Inc.; Saratoga, Inc.

[21] Appl. No.: 905,841

[22] Filed: Aug. 4, 1997

Related U.S. Application Data

[63] Continuation of Ser. No. 614,635, Mar. 13, 1996.

[51] Int. Cl.$^6$ .................................................. G09G 5/08
[52] U.S. Cl. .......................................... 345/163; 345/157
[58] Field of Search ................................. 345/157, 159, 345/163

[56] References Cited

U.S. PATENT DOCUMENTS

| | | | |
|---|---|---|---|
| 4,514,726 | 4/1985 | Whetstone et al. | 345/163 |
| 4,550,316 | 10/1985 | Whetstone et al. | 345/163 |
| 4,564,835 | 1/1986 | Dhawan | 345/163 |
| 4,794,430 | 12/1988 | Whittager et al. | 345/82 |
| 4,814,896 | 3/1989 | Heitzman et al. | 345/112 |
| 4,914,605 | 4/1990 | Loughmiller, Jr. et al. | 345/432 |
| 5,136,506 | 8/1992 | Toshyuri | 345/159 |
| 5,338,990 | 8/1994 | Beckman | 345/419 |
| 5,367,631 | 11/1994 | Levy | 345/163 |
| 5,554,980 | 9/1996 | Hashimoto et al. | 345/163 |

FOREIGN PATENT DOCUMENTS

| | | | |
|---|---|---|---|
| 404271393 | 9/1992 | Japan | 345/157 |
| WO9322758 | 11/1993 | WIPO | 345/157 |

*Primary Examiner*—Richard A. Hjerpe
*Assistant Examiner*—Ricardo Osorio
*Attorney, Agent, or Firm*—Fenwick & West LLP

[57] ABSTRACT

Pointing apparatus and method provide for control of cursor movement and selection of elements on a computer screen. Gyroscopic elements within the pointing apparatus indicate yaw and pitch movements in free space, and a mouse ball and mouse ball encoders indicate movement on a surface. Data indicative of the distance and direction the cursor is to be moved is generated from outputs of the gyroscopic elements and the mouse ball encoders. Certain amounts of movement are deemed unintentional, and, if necessary, the pointing apparatus adjusts the data so as not to indicate movement of such amounts. By doing so, the pointing apparatus minimizes unintentional cursor movement caused by instability of the gyroscopes and the inability of a person to hold the pointing apparatus absolutely motionless.

10 Claims, 15 Drawing Sheets

ELECTRONIC POINTING APPARATUS AND METHOD

RELATED APPLICATIONS

This is a continuation of co-pending application Ser. No. 08/614,635 filed on Mar. 13, 1996.

FIELD OF THE INVENTION

This invention relates generally to a pointing device, and more specifically to an electronic pointing device operable in free space for controlling a cursor on a computer-controlled display screen.

BACKGROUND OF THE INVENTION

Typically, a pointing device, such as a mouse or a track ball, is used to initiate select operations of a computer and to control movement of a display or a displayed cursor on a computer screen. A conventional mouse includes a mouse ball that rotates when the pointing apparatus moves along a substantially flat surface In response to the rotation of the mouse ball, the mouse supplies electrical signals to a computer to control movement of a display or a displayed cursor, which move in response and in relation to the rotation of the mouse ball. A track ball functions in a similar way, except that a user manually rotates the track ball instead of moving it along a surface.

A limitation with these conventional devices is that they are not operable in free space because a mouse requires a flat surface and practical applications constrain a track ball to use in a fixed position on a surface. Free-space operation is desirable to provide a user with greater freedom of movement and to eliminate the need for a reference surface.

Gyroscopic pointing devices that are operable in free space to select icons on a computer-controlled display screen have been developed. A gyroscopic pointing device includes a gyroscope that generates an output signal indicative of the angular movement of the pointing device. A problem with gyroscopic pointing devices is that the inherent instability of gyroscopes and the likely inability of a user to hold a pointing device absolutely motionless can cause a gyroscope to indicate movement were none is intended. To remedy this, known gyroscopic pointing devices do not translate slow movement of the pointing device into cursor movement on a display screen. Consequently, the cursor only moves in response to quick movement of the pointing device, reducing user control and rendering it difficult for a user to move a cursor with fine positional resolution. Therefore, it is desirable to provide a gyroscopic pointing device that operates in free space and minimizes unintentional cursor movement, while still providing the user with at least as much control as is provided by a conventional mouse. Additionally, known gyroscopic pointing devices are not capable of operating as conventional mice, and, thus, a need exists for a gyroscopic pointing device that can be used conveniently with a computer-controlled display and that has the versatility to operate either on a reference surface in the manner of a conventional mouse or in free space.

SUMMARY OF THE INVENTION

The present invention provides a method and apparatus for initiating select operations of a computer and for controlling movement of a display or a displayed cursor on a computer-controlled display screen. The apparatus of the present invention includes two gyroscopic elements that indicate yaw and pitch movements of the apparatus in free space. Additionally, the apparatus of the present invention includes a mouse ball and mouse ball encoders for indicating movement of the apparatus on a surface. A microprocessor coupled to the gyroscopic elements and the mouse ball encoders generates data indicative of a distance and a direction the display or the displayed cursor is to be moved.

In the process of generating the movement data, the microprocessor minimizes unintentional cursor movement caused by instability of the gyroscopes and the inability of a person to hold the pointing apparatus absolutely motionless. Specifically, movement below a first threshold amount (undetectable to a person) is deemed unintentional movement, and the microprocessor adjusts the movement data to inhibit an indication of such movement. Movement above the first threshold amount and below a second threshold amount is deemed partially intentional and partially unintentional, and, consequently, the microprocessor reduces the amount of movement indicated by the data. Additionally, the microprocessor estimates bias offsets of the gyroscopes to remove the effect of these offsets from the movement data.

DETAILED DESCRIPTION OF THE PREFERRED EMBODIMENTS

The pointing apparatus of the present invention operates in a mouse mode and in a free space mode. In the mouse mode, the pointing apparatus functions like a conventional mouse, operating on a substantially flat surface to move and select an element on a computer-controlled graphics display screen. In the free space mode, the pointing apparatus performs the same functions, but operates in free space, where a user controls movement of a display or a displayed cursor by rotating the pointing apparatus in the direction the user wants the display or the displayed cursor to move.

Figure 1A:
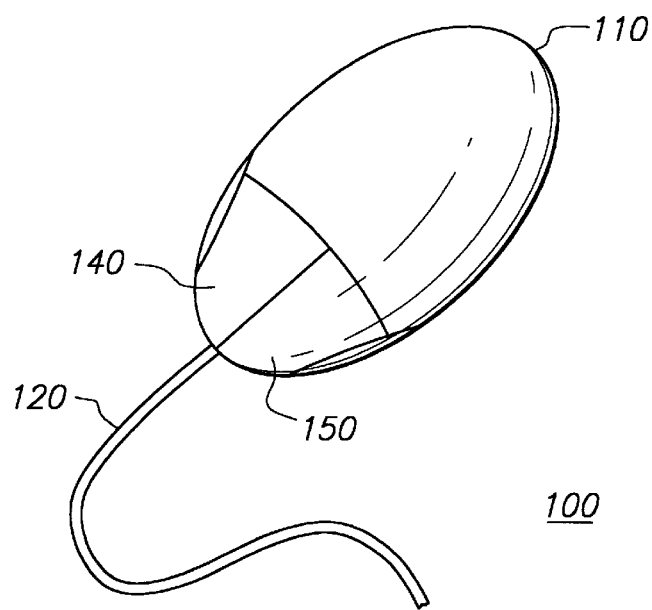
FIGS. 1A and 1B are perspective views of the exterior of the pointing apparatus of the present invention.
Figure 1B:
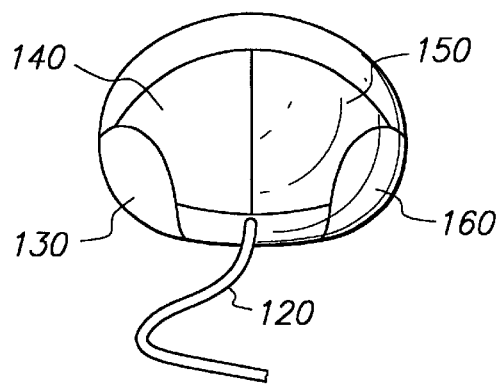

FIGS. 1A and 1B illustrate a perspective view of the exterior of the present invention. The pointing apparatus 100 has a generally elliptical shaped housing of molded plastic. The housing is designed to be easily held in one hand on side 110. A standard Electronic Industries Association six-pin mouse-port cable 120 extends from the housing. The six-pin mouse port cable 120 either plugs directly into the mouse port of a conventional host computer or plugs into another cable, as is the case when the pointing apparatus is coupled to an Apple computer, a Phillips CD-I player, or a PC computer with a serial port. The other cable may be an adapter cable which plugs into the mouse port of the host computer or may be a nine pin serial port cable which plugs into the serial port of the host computer. The adapter cable allows the pointing apparatus to be coupled to a mouse port when the pin configuration of the mouse port does not correspond to the pins in the mouse-port cable 120.

The housing includes buttons 130, 140, 150, 160 that are constructed in the same manner as mouse buttons found in generally-available mouse controllers. In mouse mode, buttons 140 and 150 are select buttons which allow a user to select an icon or an element on the computer-controlled display screen. Buttons 130 and 160 are not used in the mouse mode.

For a right-handed person operating the pointing apparatus 100 in the free space mode, button 130 is an activate button, button 150 is a steady button, and buttons 160 and 140 are the select buttons. The steady button 150, when depressed at the same time as button 140, enables a user to control cursor drift, and the activate button 130, when double clicked or while depressed, allows movement of data from the gyroscopes to the host computer, in a manner later described herein, providing the pointing apparatus is not in mouse mode.

Figure 2:
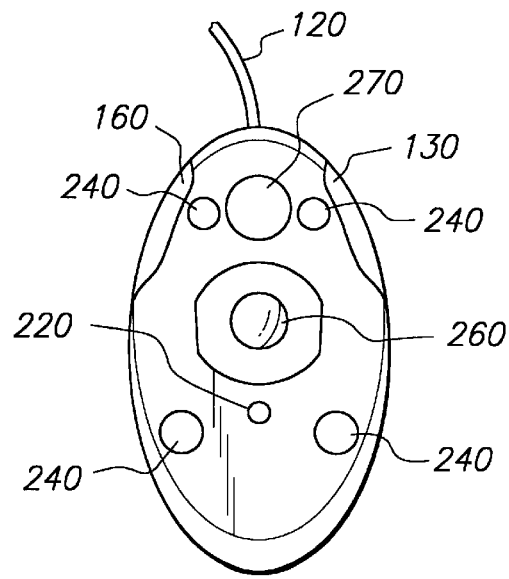
FIG. 2 is a perspective view of a bottom side of the pointing apparatus of the present invention.

FIG. 2 illustrate a bottom side of the pointing apparatus 100. A screw 220 secures the bottom side of the housing to a top side, and conventional feet pads 240 facilitate the movement of the pointing apparatus 100 on a flat reference surface. A portion of a conventional mouse ball 260 extends out of an opening in the housing. Additionally, a plunger 270, which is part of a ball locking mechanism (FIGS. 5, 6, 7) that prevents the mouse ball 260 from moving when the pointing apparatus 100 is in free space, extends out of another opening in the housing. When the bottom side of the pointing apparatus 100 contacts a substantially flat surface, the plunger 270 is pushed through the opening to a position substantially level with the surface of the bottom side. As discussed below, this allows the mouse ball 260 to move freely. Conversely, when the pointing apparatus 100 operates in free space, the plunger 270 extends further out from the opening, and the ball locking mechanism prevents the mouse ball 260 from moving, as more fully described later herein.

Figure 3:
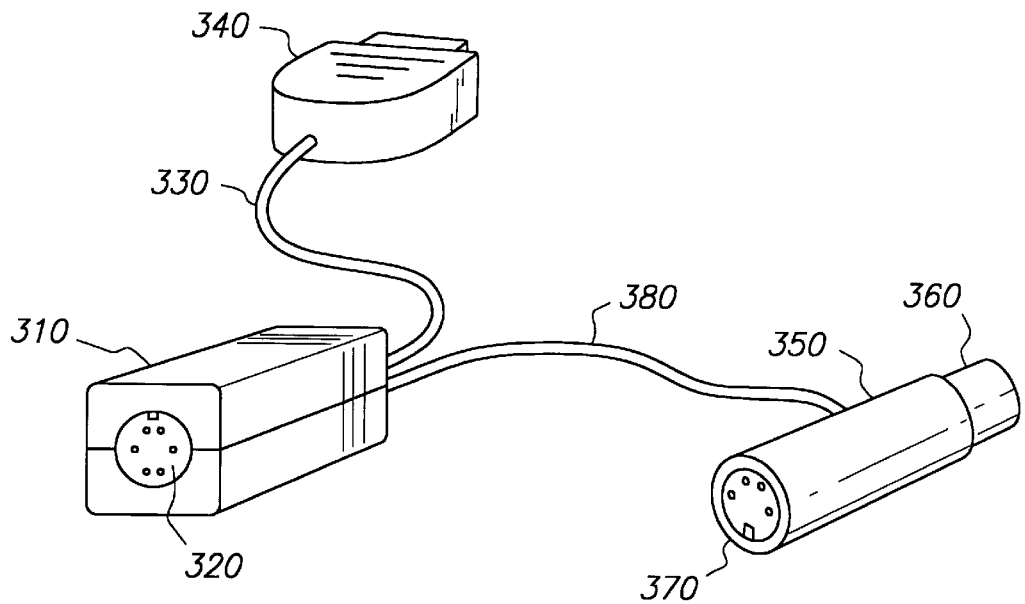
FIG. 3 is a perspective view of a serial port cable of the present invention.

The nine-pin serial-port cable 300 is shown in FIG. 3. A mouse cable connector 310 receives the six-pin mouse-port cable 120 at port 320. A conductor 330 connects the mouse cable connector 310 to a DB9 connector 340, which plugs into a serial port of the host computer. Because a serial port does not provide adequate power for the pointing apparatus 100, a keyboard connector 350 taps power from a keyboard port of the computer while still allowing a keyboard to be plugged in. Specifically, four pins (not shown) on end 360 of a keyboard connector 350 plug into the keyboard port, and a standard four pin keyboard cable connected to the keyboard is plugged into port 370. Electric signals traveling from the keyboard to the computer and vice versa are passed through the keyboard cable and through the keyboard connector 350. A conductor 380 couples the mouse cable connector 310 and the keyboard connector 350.

Figure 4:
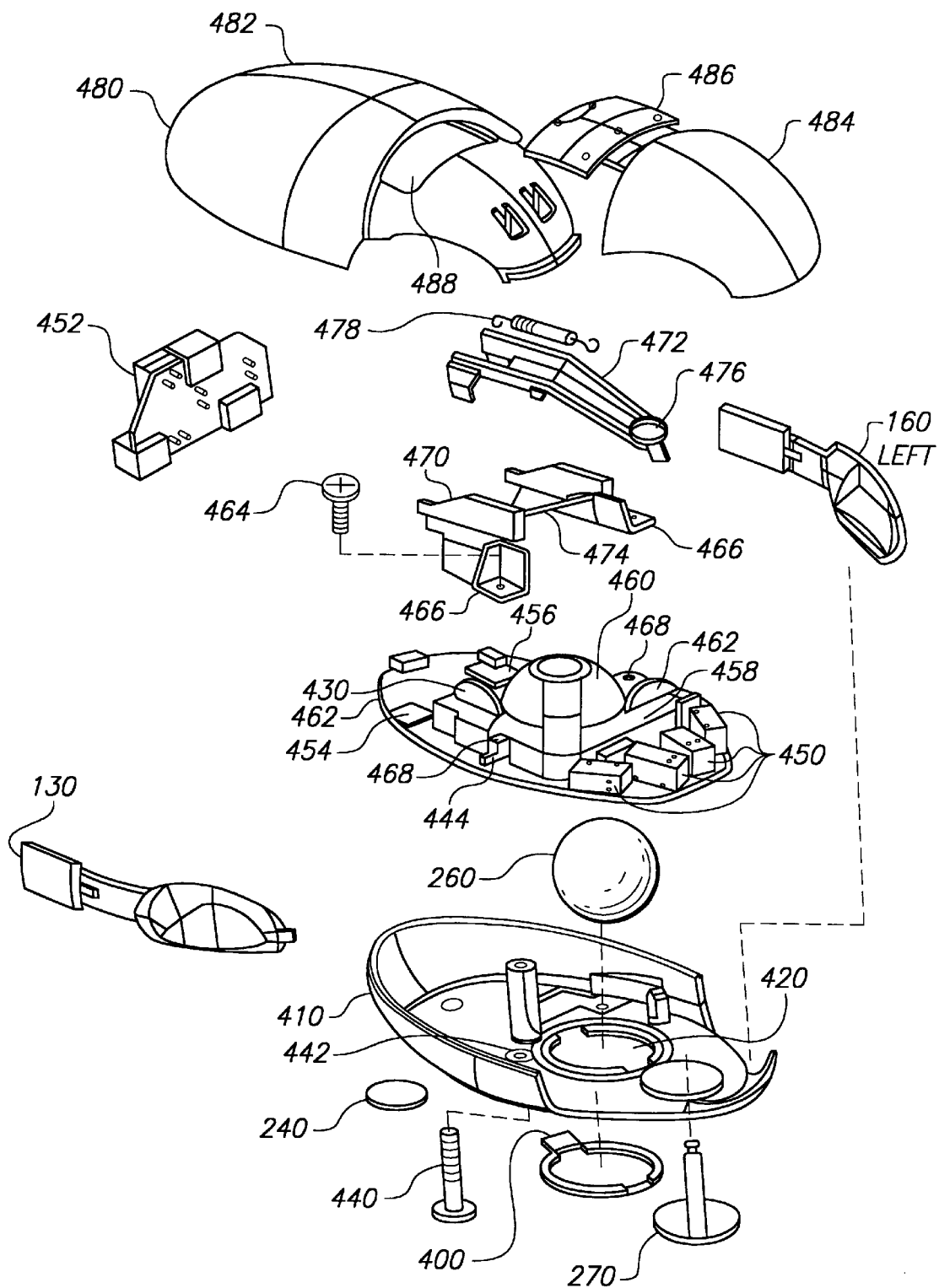
FIG. 4 is a perspective view of the assembly of the pointing apparatus of the present invention.

FIG. 4 illustrates the assembly of the pointing apparatus 100. A conventional, ring-shaped mouse door 400 is attached to the bottom cover 410 to allow a portion of the mouse ball 260 to fit through, but not fall through, opening 420. Buttons 130 and 160 are also attached to the bottom cover 410. Additionally, the feet pads 240 are attached to the bottom cover 410, and a main printed circuit board 430 is secured to the inside of the bottom cover 410 with a screw 440 that fits through openings 442 and 444. Another screw also fits through corresponding holes in the other side of the pointing apparatus 100.

The main printed circuit board 430 includes a data processing circuit having conventional tactile switches 450 that inform the data processing circuit when one or more of the buttons 130, 140, 150, 160 is depressed. A gyroscope printed circuit board 452 interfaces with the data processing circuit and is attached to the main printed circuit board 430 at points 454 and 456. A platform 458 is constructed from molded plastic and has a dome-shaped member 460 that partially encloses the mouse ball 260. The platform 458 is attached to the main printed circuit board 430. Conventional mouse ball encoders 462 are secured to the platform 458.

As described below, a base 470 of the ball locking mechanism is placed above the dome-shaped member 460 and secured in place with screws at locations 466 and 468. A lever 472 of the ball locking mechanism contacts a central strip 474 of the base 470, and the plunger 270 is connected to the lever 472 at location 476.

The pointing apparatus of the present invention may include other conventional components found in generally-available mouse controllers. Once all the internal component of the pointing apparatus are properly assembled, a top cover 480 of the housing is secured to the bottom cover 410. The top cover 480 of the housing includes members 482 and 484, which are attached by inserting a tab 486 on member 484 into a slot 488 on member 482.

Figure 7:
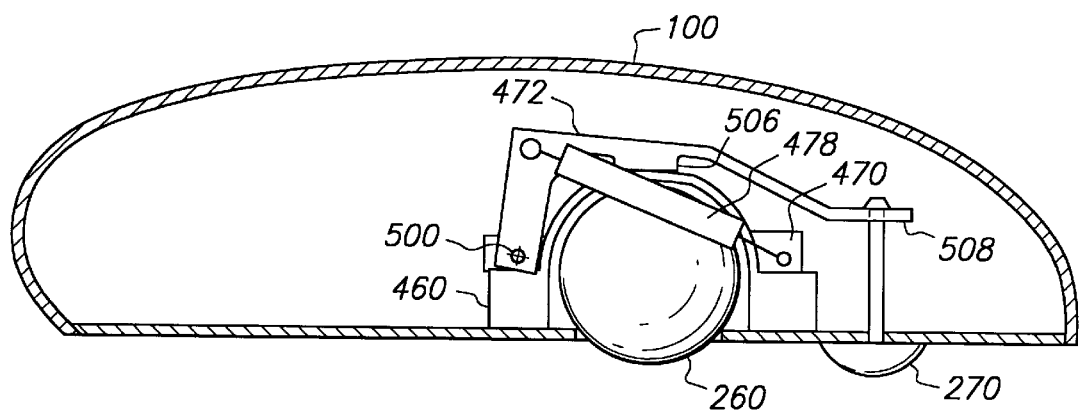
FIG. 7 is a sectional view of the ball locking mechanism of the present invention.
Figure 5:
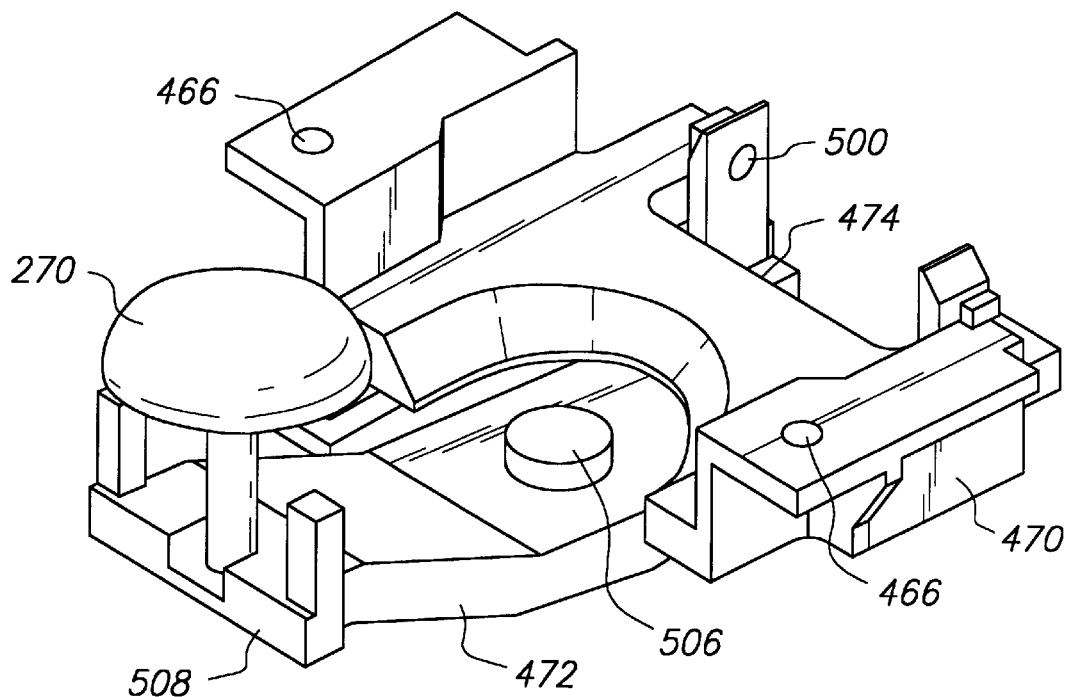
FIG. 5 is a perspective view of the underside of a ball locking mechanism of the present invention.
Figure 6:
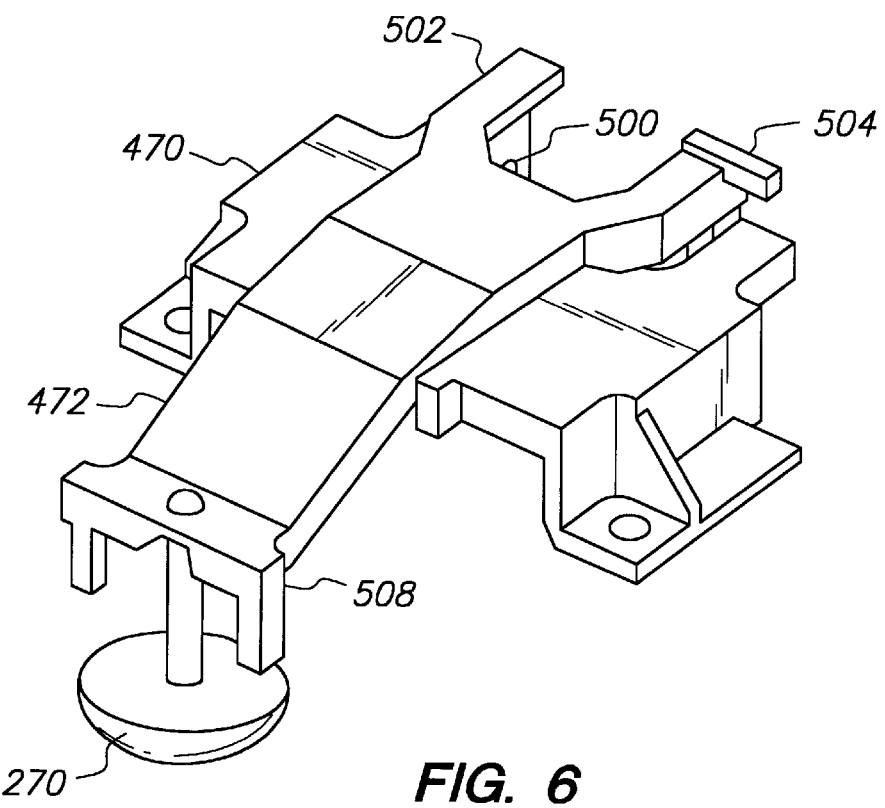
FIG. 6 is a perspective view of the ball locking mechanism of the present invention.

Referring now to the perspective views of FIGS. 5 and 6 and the sectional view of FIG. 7, there is shown the ball-locking mechanism, including a base 470, a lever 472 and a plunger 270, all of which are molded from plastic. As discussed above, screws fit into openings 466 of the base 470 to attach the base 470 to the platform 458. The base 470 supports the lever 472 on the recessed central strip 474, and pivots secure one end of the lever 472 to the base 470, thereby allowing an opposite end 508 of the lever 472 to move up and down. In FIGS. 5, 6 and 7, only a first pivot 500 is shown on branch 502 of one end of the lever 472, but a second pivot is located in a corresponding position on branch 504.

The underside of the lever 472 has an elevated, circular, central region 506 which lies above a part of the mouse ball 260 exposed by an opening in the dome-shaped member 460. A tension spring 478 (not shown in FIGS. 5 and 6 for simplicity), which has one end coupled to the lever 472 and another end coupled to the base 470, exerts a downward force on end 508 of the lever 472. Consequently, when the unattached end of the plunger 270 lies in free space, end 508 of the lever 472 moves down until the elevated central region 506 contacts the mouse ball 260, thereby preventing the mouse ball 260 from moving. Conversely, when the plunger 270 contacts a surface, end 508 of the lever 472 is held up. This allows the mouse ball 260 to move freely because the elevated central region 506 is positioned out of contact with the mouse ball 260.

Figure 8:
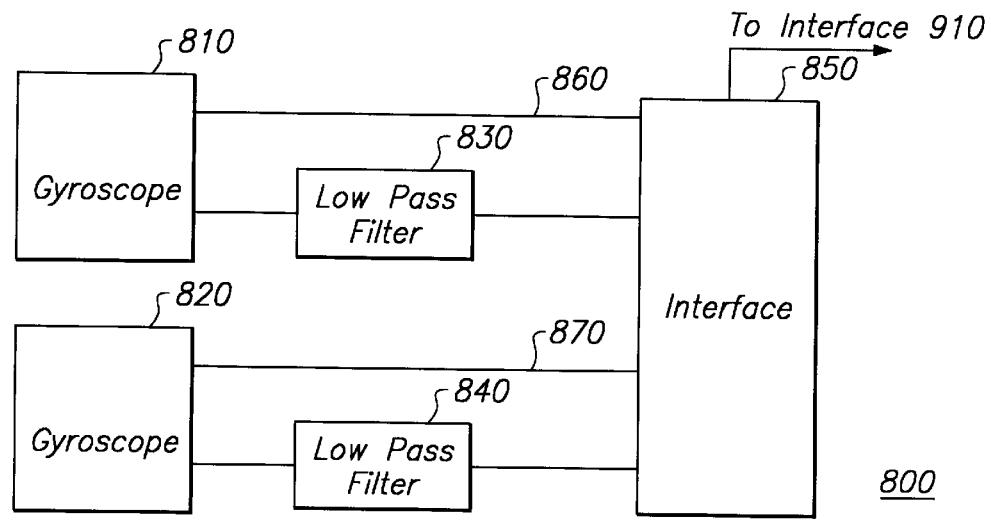
FIG. 8 is a block diagram of a gyroscope circuit of the present invention.

Referring now to the simplified block diagram of FIG. 8, a gyroscope circuit 800 on the gyroscope printed circuit board 452 includes two gyroscopes or gyroscopic elements 810, 820, such as the Gyrostar rate gyroscopes manufactured by Murata, Inc. In an alternate embodiment, gyroscopes 810, 820 may be the gyroscopes described in U.S. patent application Ser No. 08/593,534, titled "VIBRATORY RATE GYROSCOPE AND METHODS OF ASSEMBLY AND OPERATION", filed on Jan. 24, 1996 by Steven P. Hotelling and Brian R. Land. Each of the gyroscopes 810, 820 provide an analog output signal with a voltage value proportional to the rate of angular rotation of the pointing apparatus 100. The output of gyroscope 810 corresponds to yaw movement of the pointing apparatus 100, and the output of gyroscope 820 corresponds to pitch movement of the pointing apparatus 100.

Low pass filters 830, 840, which have a cut-off frequency of approximately sixty hertz, filter the output signals of the gyroscopes 810, 820. Low pass filters 830, 840 may be conventional amplifiers, configured to operate as low pass filters, that amplify and filter the output signals. The cut off frequency of the low pass filters 830, 840 is selected to be well above the frequency of the maximum hand rate movement (about four hertz) of a user during normal operations of the pointing apparatus 100.

Figure 9:
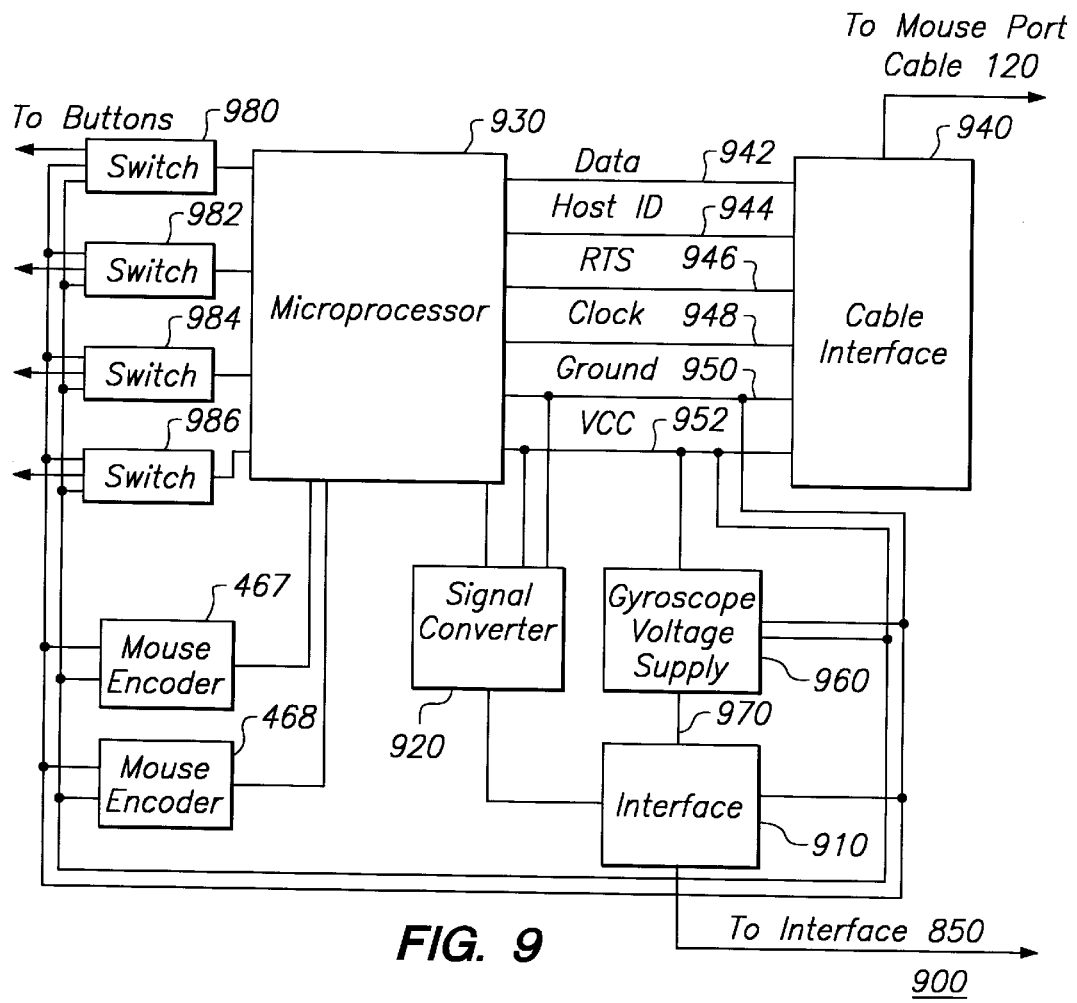
FIG. 9 is a block diagram of a data processing circuit of the present invention.

After being filtered, the gyroscope outputs are supplied to an interface 850 which interfaces the data-processing circuit 900 illustrated in the simplified block diagram of FIG. 9. From interface 850, the output signals are supplied to interface 910 on the data processing circuit. Interfaces 850 and 910 are conventional interfaces between integrated circuit boards. Interfaces 850 and 910 may be conventional six-pin circuit board connectors. In an alternate embodiment, the gyroscopes and the low pass filters are placed on the same circuit board as the data-processing circuit, eliminating the need for interfaces 850 and 910.

A signal converter 920, such as a conventional twelve-bit, analog-to-digital (A/D) converter, receives the filtered, analog output signals from interface 910 and converts each of them into a binary number having a value between zero and 4095 corresponding to the voltage value of the gyroscope outputs. From the A/D converter 920, the output signals are supplied to a microprocessor 930, such as the HCO5 microprocessor manufactured by Motorola, Inc.

Output signals from conventional mouse encoders 467, 468 are also supplied to the microprocessor 930. These signals correspond to movement of the mouse ball 260, which, when properly resting on a surface, contacts the surface and rotates in response to and in relation to movement of the pointing apparatus 100.

Six conductor lines in the mouse-port cable 120 carry signals to and from the pointing apparatus 100, and these lines interface the data processing circuit 900 at a cable interface 940. The cable interface 940 interfaces the six lines with the data processing circuit by conventional methods. The six lines are a data line 942, a host ID line 944, a RTS line 946, a clock line 948, a ground line 950 and a VCC line 952.

The data line 942 carries data signals between the microprocessor 930 and the host computer. As discussed below, signals on the RTS line 946 and the host ID line 944 provide the microprocessor 930 with the identity of the host computer. When the mouse port cable 120 is plugged into a mouse port, the clock line 948 carries a dock signal to which the data on the data line 942 will be synchronized by the microprocessor 930. The VCC line 952 carries power from either the mouse port or the keyboard port of the computer, and it is coupled to all components needing power in the pointing apparatus 100. Similarly, the ground line 950 provides a common ground for the pointing apparatus 100 and is coupled to all components requiring a common ground.

Because the gyroscopes 810, 820 may require a different or more steady voltage level than the VCC voltage level, a gyroscope voltage source 960 provides power to the gyroscopes. The gyroscope voltage source 960 is coupled to the VCC line 952 and derives power for the gyroscopes 810, 820 from the VCC voltage by conventional methods. Interfaces 850 and 910 and lines 970, 860 and 870 couple the gyroscope voltage source 960 to the gyroscopes 810, 820. Note that the conductor lines in FIGS. 8 and 9 are used primarily to show connections among components and are not necessarily indicative of the number of conductor lines connecting any two components.

Each of the activate, select and steady buttons 130, 140, 150, 160 controls one of conventional switches 980, 982, 984, 986 which are coupled between the VCC line 952 and the microprocessor 930. When a user depresses one of the buttons 130, 140, 150, 160, the switch corresponding to that button closes, thereby allowing the VCC signal to reach the microprocessor 930. This indicates to the microprocessor 930 that the button has been depressed.

Figure 10:
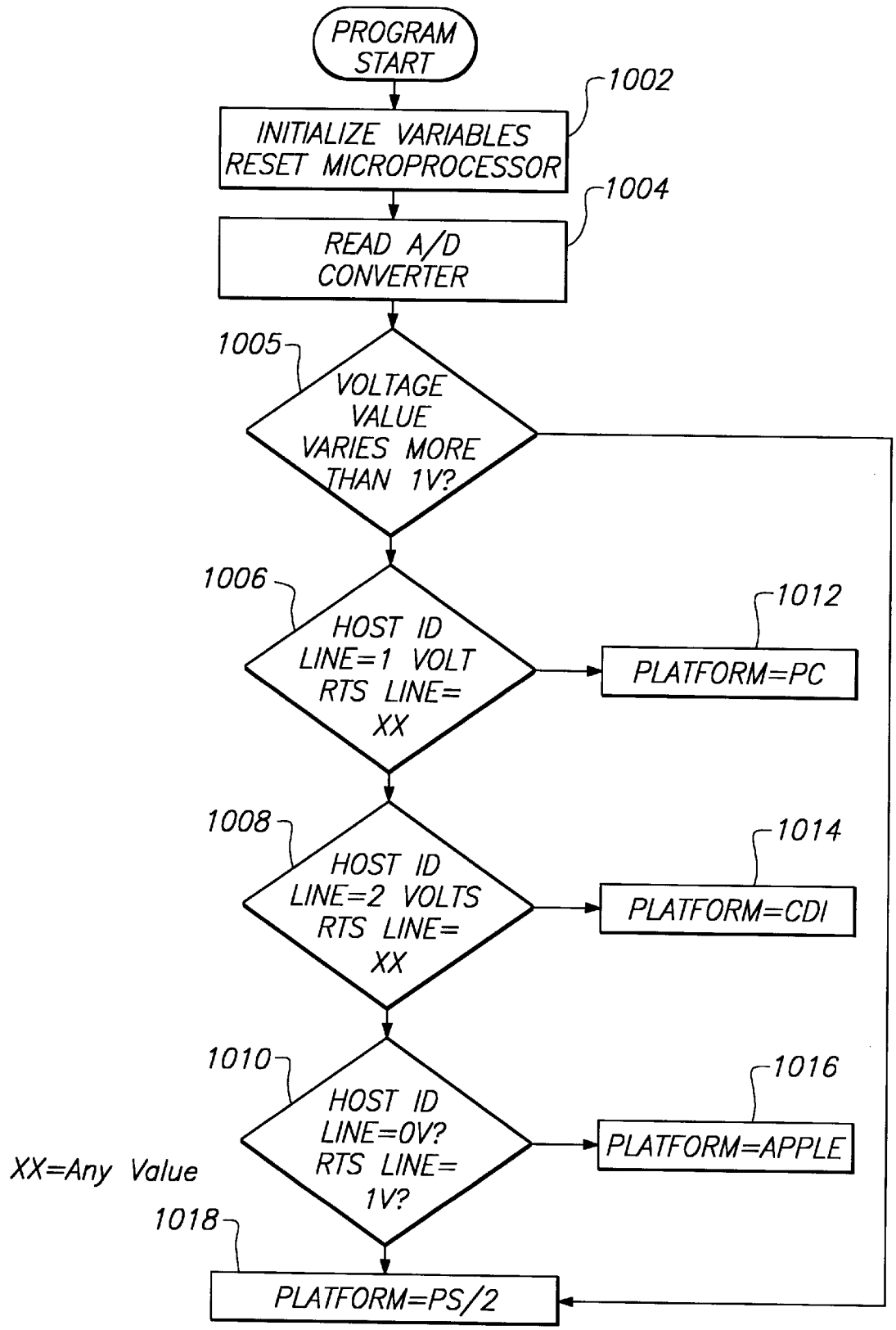
FIGS. 10–17 are flow charts illustrating the method of the present invention.

With reference to FIGS. 10–17, the operation of an embodiment of the pointing apparatus will be described. FIG. 10 illustrates the host platform identification method of the preferred embodiment, which is performed by software running on microprocessor 930. When the pointing apparatus 100 is first powered up, the microprocessor 930 is reset 1002, and software variables are initialized 1002. After being reset, the microprocessor 930 identifies the type of host computer to which the pointing apparatus 100 is coupled. The pointing apparatus 100 is compatible with several conventional platforms, such as PS/2 computers, PC computers (AT style serial ports), Apple computers (with the Apple Desktop Bus) and Phillips CD-I players. To ascertain the host computer identity, the method of the present invention dedicates two conductors, the host ID and the RTS lines 944, 946, in the mouse connector cable 120 to computer identification, and, when either an adapter cable or the serial port cable is used, each of these lines 944, 946 is coupled to a separate resistor divider located in the cable used. An analog-to-digital (A/D) converter provided on microprocessor 930 samples the host ID and the RTS lines 944, 946. Microprocessor 930 reads 1004 the outputs of the A/D converter twice and determines 1005, 1006, 1008, 1010 the identity of the host computer platform from the voltage values of the sampled RTS and host ID lines 944, 946.

Some PS/2 computers use one or both of the RTS and host ID lines 944, 946 for purposes other than host computer identification. Thus, in one embodiment, if the voltage value on either the RTS line 946 or the host ID line 944 varies more than a select amount, such as 1 volt, from the first reading of the A/D converter outputs to the second reading of the A/D converter outputs, the microprocessor identifies 1018 the host computer as a PS/2. This method assumes that if the voltage on at least one of the RTS and host ID lines 944, 946 varies more than the select amount between the two readings, at least one of these lines is being used for purposes other than host computer identification, and, thus, the host computer must be a PS/2. This method reduces the likelihood of the microprocessor 930 mistaking the voltages values on these lines for the identification values of another computer.

If the voltage values on neither the host ID line 944 nor RTS line 946 varies more than one volt from the first reading of the A/D converter to the second reading of the A/D converter, the microprocessor 930 determines the identity of the host computer from the values of the host ID and RTS lines 944, 946. In response to the value of the host ID line 944 being one volt, the microprocessor 930 identifies 1012 the computer as a PC, and, in response to the value of host ID line 944 being two volts, the microprocessor 930 identifies 1014 the computer as a CD-I player. If the value of the host ID line 944 is zero volts and the value of the RTS line 946 is one volt, the microprocessor 930 recognizes 1016 that the platform is an Apple computer. A cable having resistor dividers, such as an adapter cable or the serial port cable 300, is not used to couple the pointing apparatus to a PS/2 computer. Consequently, the default platform is 1018 the PS/2 computer, but those skilled in the art will appreciate that the defaults and voltage values assigned to computer platforms are arbitrary and can be varied. In an alternate embodiment, digital values may be used to identify of the host computer platform, eliminating the need for the A/D converter on the microprocessor 930 and the resistor dividers.

Figure 11:
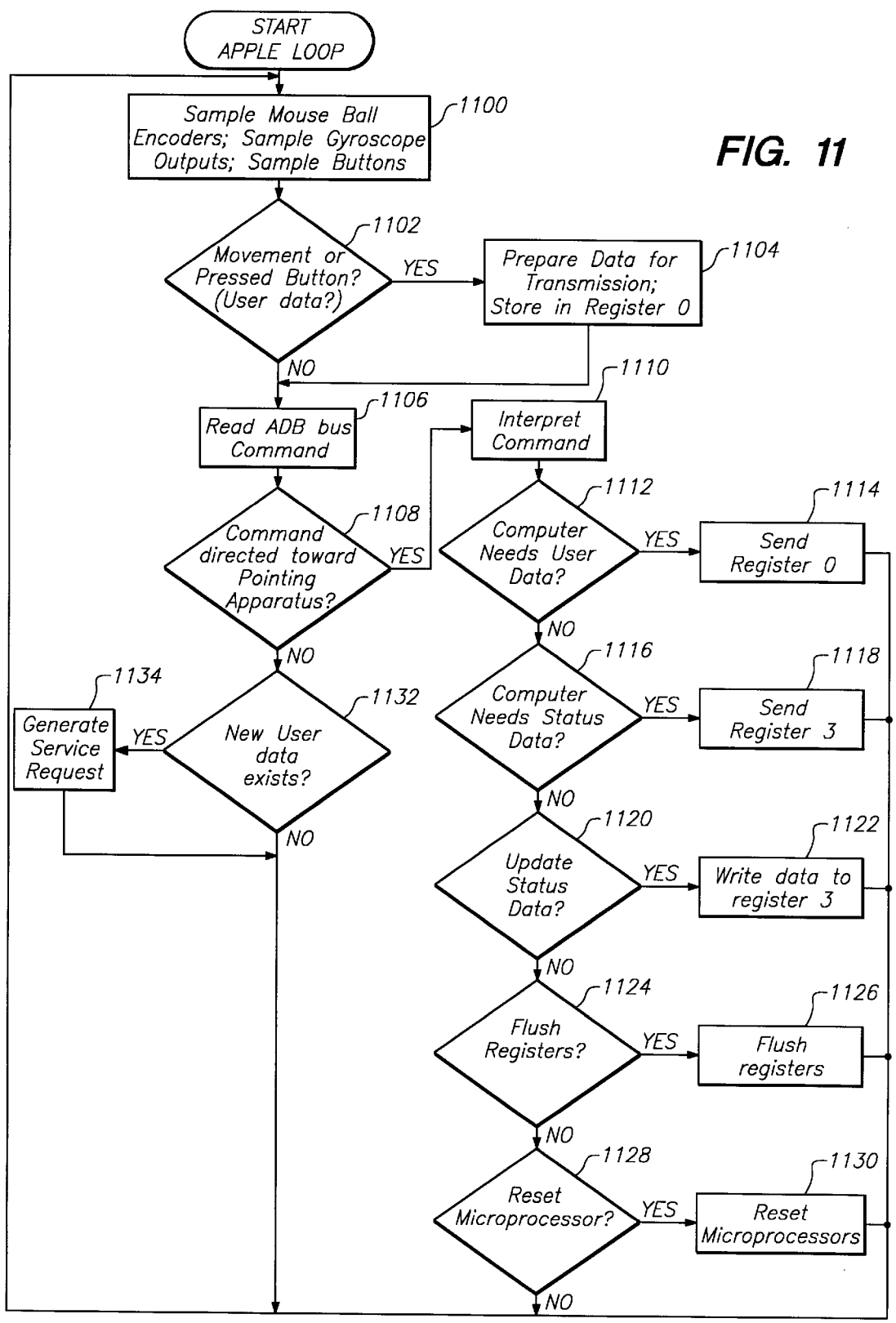

FIG. 11 illustrates the operation of the pointing apparatus with respect to an Apple computer. After determining that the host computer is an Apple, the microprocessor begins 1100 a sample cycle, where the status of the buttons 130, 140, 150, 160 are determined and the outputs of the gyroscopes 810, 820 and the mouse encoders 467, 468 are sampled. In a sample cycle, the microprocessor 930 generates data from the sampled outputs and the status of the buttons, and in response to the data indicating a change in the status of the select buttons or intentional movement of the pointing apparatus, the microprocessor 930 identifies the data as user data needing to be transmitted to the host computer.

Upon completion of the sample cycle, the microprocessor 930 determines 1102 whether user data exists. In response to the existence of user data, the microprocessor 930 prepares 1104 the user data for transmission to the host computer and stores 1104 it in the appropriate register within the microprocessor. The appropriate register is register zero, in accordance with specifications for the Apple Desktop Bus (ADB) manufactured by Apple Computer, Inc.

The microprocessor then reads 1106 ADB commands, and, if it identifies 1108 a command directed to the pointing apparatus 100, it interprets 1110 and carries out the command in accordance with ADB specifications. Specifically, if the microprocessor 930 determines 1112 that the host computer wants to read the user data, it sends 1114 the user data, stored in register 0, to the host computer. Similarly, if the microprocessor 930 determines 1116 that the host computer needs information concerning the status of the pointing apparatus 100 (i.e. the ID of the pointing apparatus, whether the pointing apparatus is enabled or disabled and etc.), status data, stored in register 3, is sent 1118. When the microprocessor 930 identifies 1120 that the host computer wants to update the status data, data is written 1122 to register 3. Additionally, when the microprocessor 930 ascertains 1124 that the command is to flush the registers, the registers are flushed 1126, and, when the microprocessor 930 ascertains 1128 that the command is to reset the microprocessor 930, the microprocessor 930 is reset 1130. After a command has been interpreted and carried out, the microprocessor 930 returns to step 1100 and begins another sample cycle.

If the host computer does not transmit a command for the pointing apparatus 100, the microprocessor 930 determines 1132 whether new user data exists, and, if not, returns to step 1100 to commence a new sample cycle. If new user data exists, the microprocessor 930 generates 1134 a service request, which informs the host computer that new user data exists and that, consequently, the microprocessor 930 should be enabled, through a command, to transmit the data to the host computer. The microprocessor 930 then returns to step 1100 and begins another sample cycle.

Figure 12:
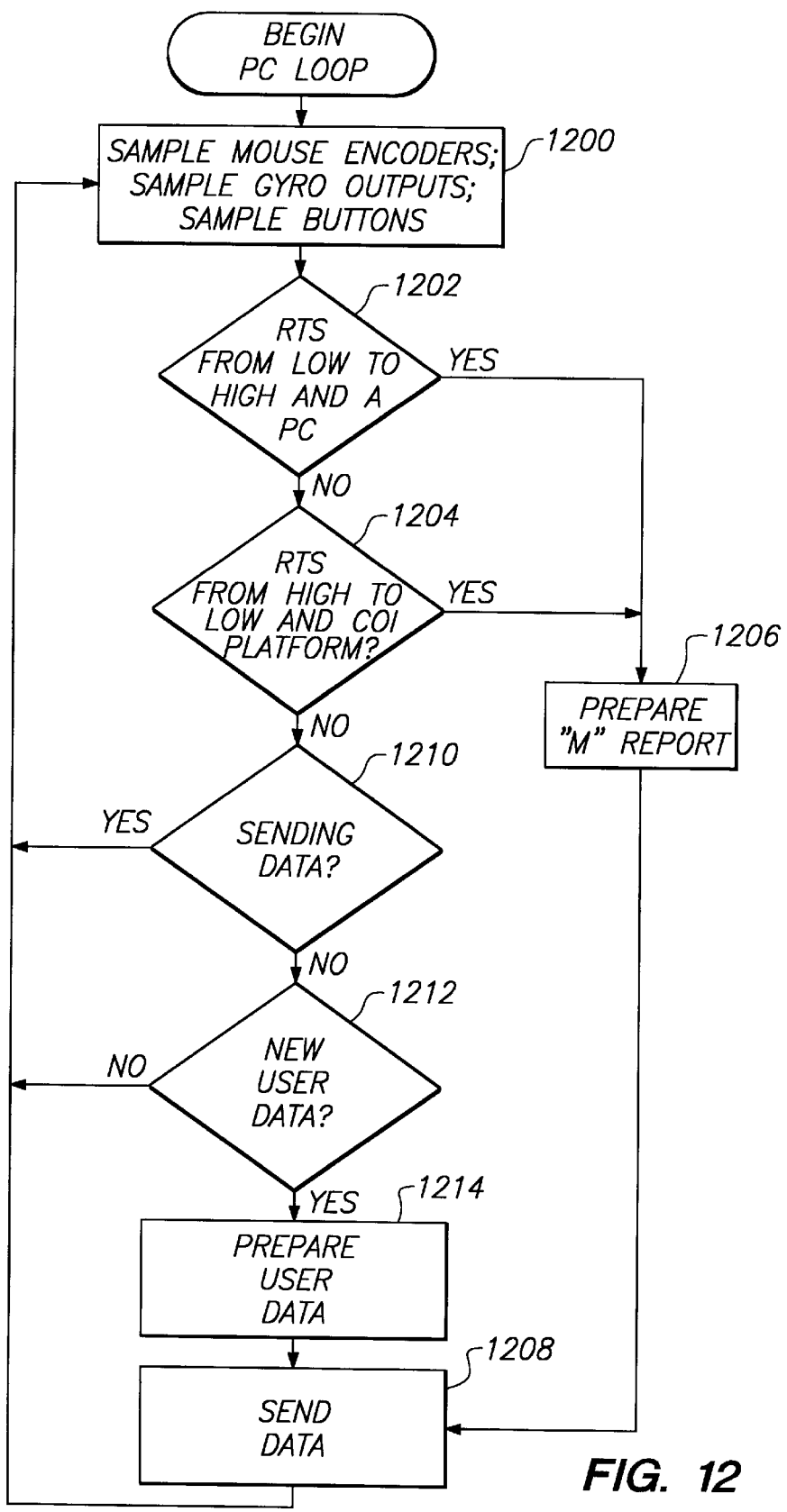

The operation of the pointing apparatus with respect to a PC computer or a CD-I player is shown in FIG. 12. After completing 1200 a sample cycle, the microprocessor 930 decides 1202, 1204 whether a "M" report, which is an ASCII (American Standard Code for Information Exchange) code representative of the character "M", should to be prepared 1206 and sent 1208 to inform the host computer that a pointing apparatus is coupled to it. Upon power up, a PC or a CD-I player will toggle the RTS line 946, and, if it receives a "M" report in response, it knows that a mouse is coupled to it. The microprocessor 930 sends a "M" report when either the RTS line 946 transitions from low to high and the host computer is a PC or when the RTS line 946 transitions from high to low and the host computer is a CD-I player.

If a "M" report does not need to be sent, the microprocessor determines 1210 whether data is currently being sent to the host computer. The pointing apparatus 100 continues to monitor for new user data even while it is sending user data. Thus, if user data is currently being sent to the host computer, the microprocessor 930 returns to step 1200 to begin another sample cycle. Otherwise, the microprocessor 930 decides 1212 whether new user data exists, and, in response to the existence of new user data, prepares 1214 the new user data for transmission in accordance with PC or CDI protocol and sends 1208 it to the host computer. The microprocessor 930 then returns to step 1200 to begin another sample cycle and repeat this process.

Figure 13:
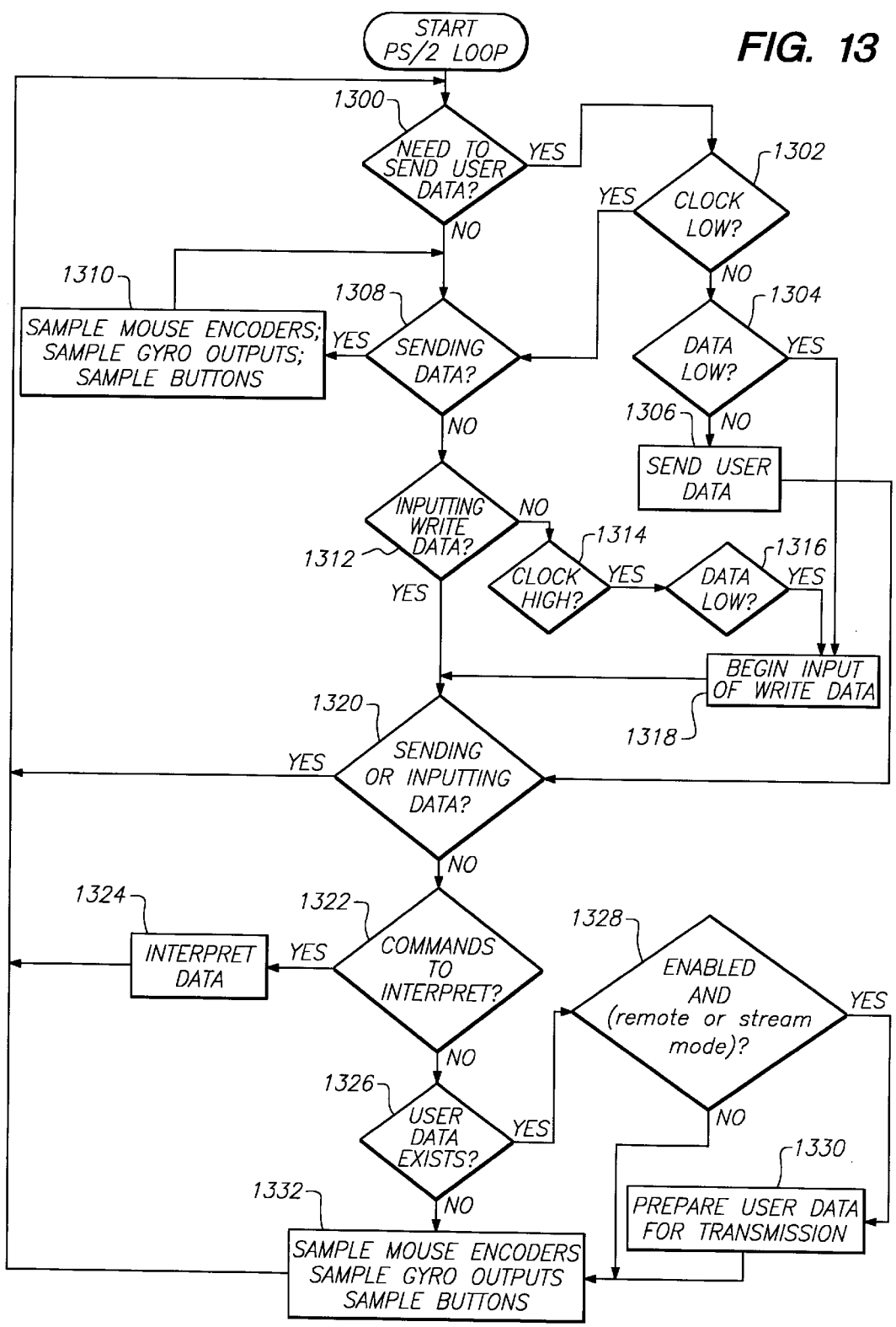
Figure 14:
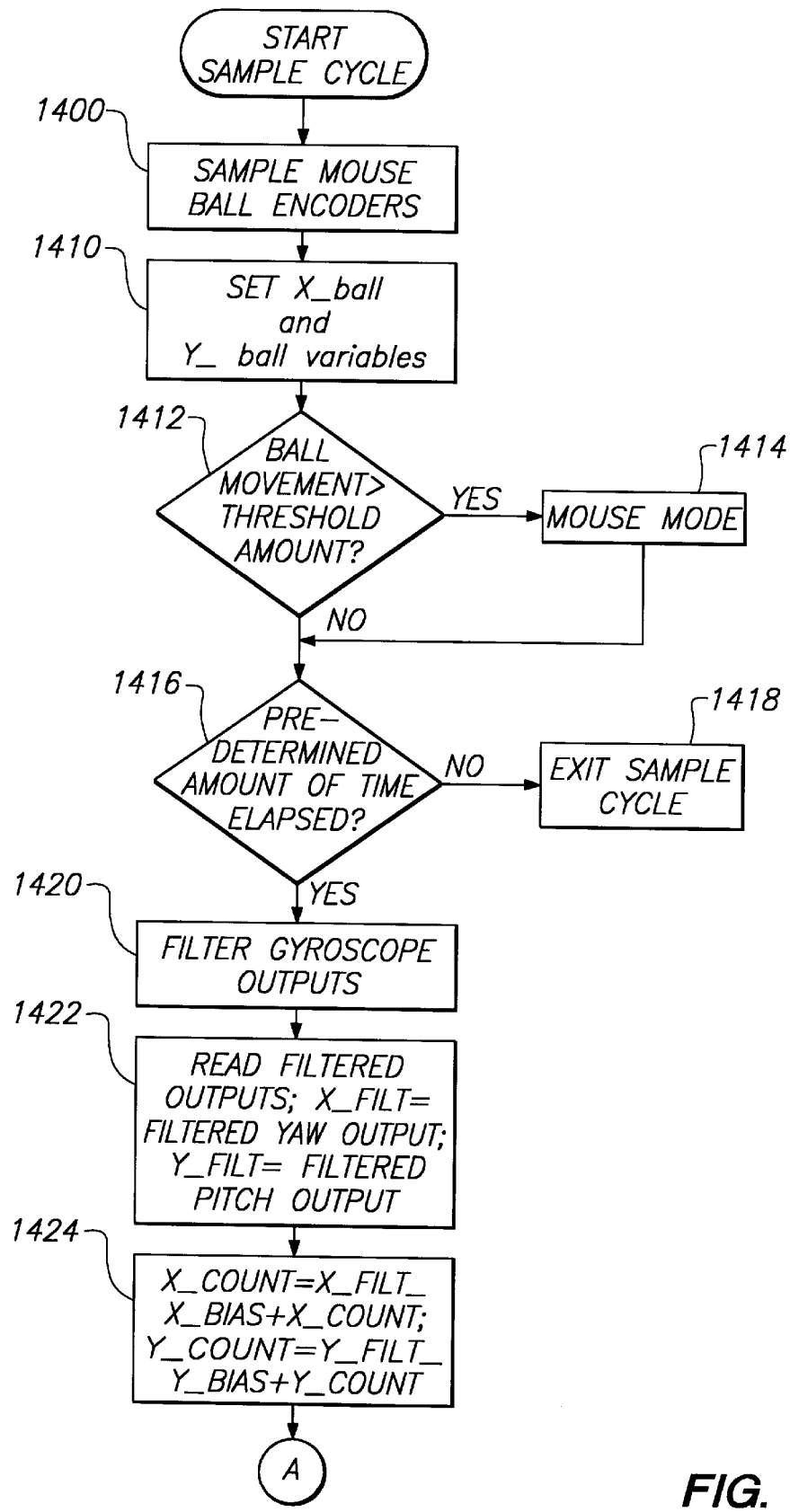
Figure 15A:
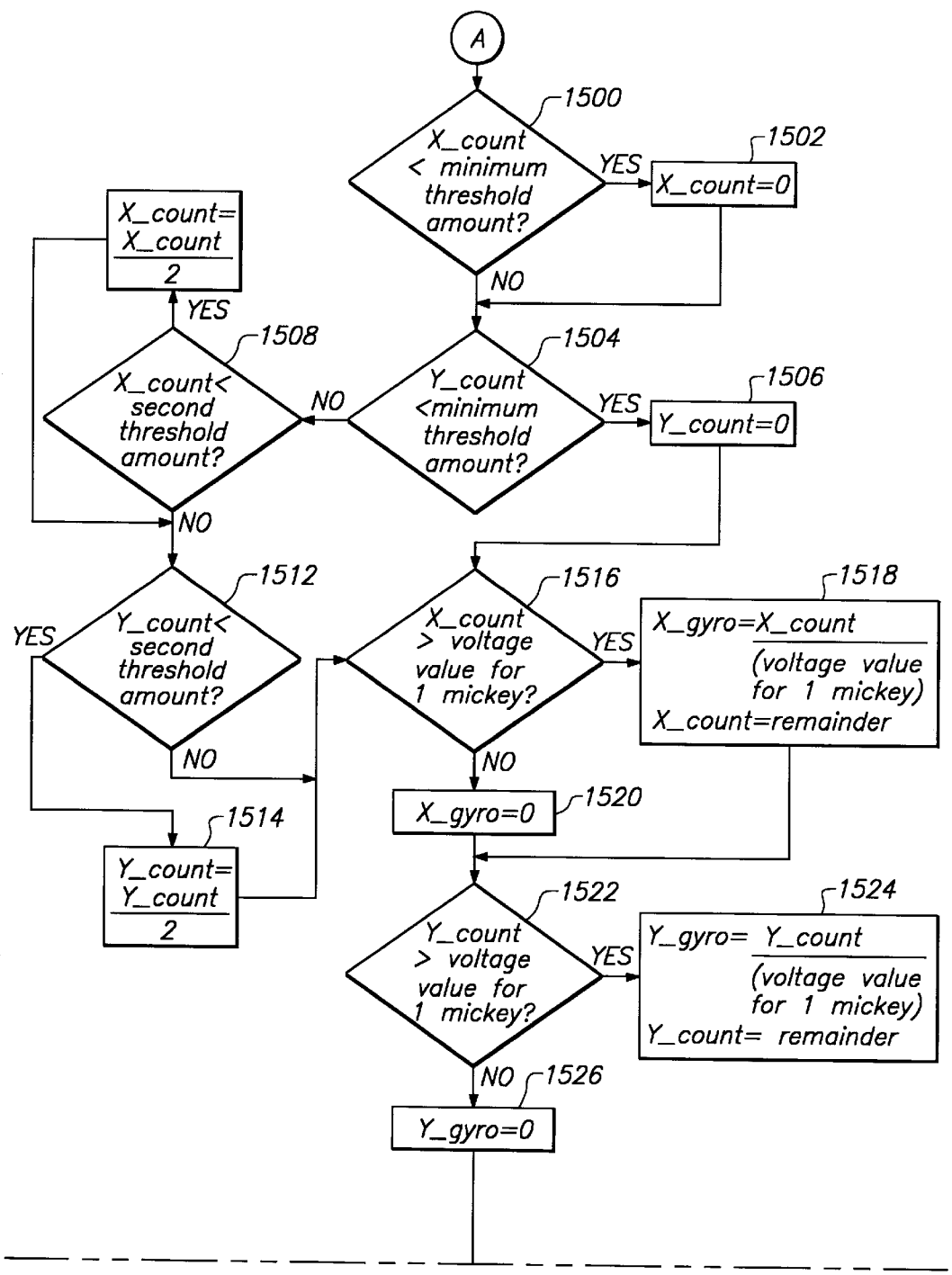
Figures 15, 15A, 15B:
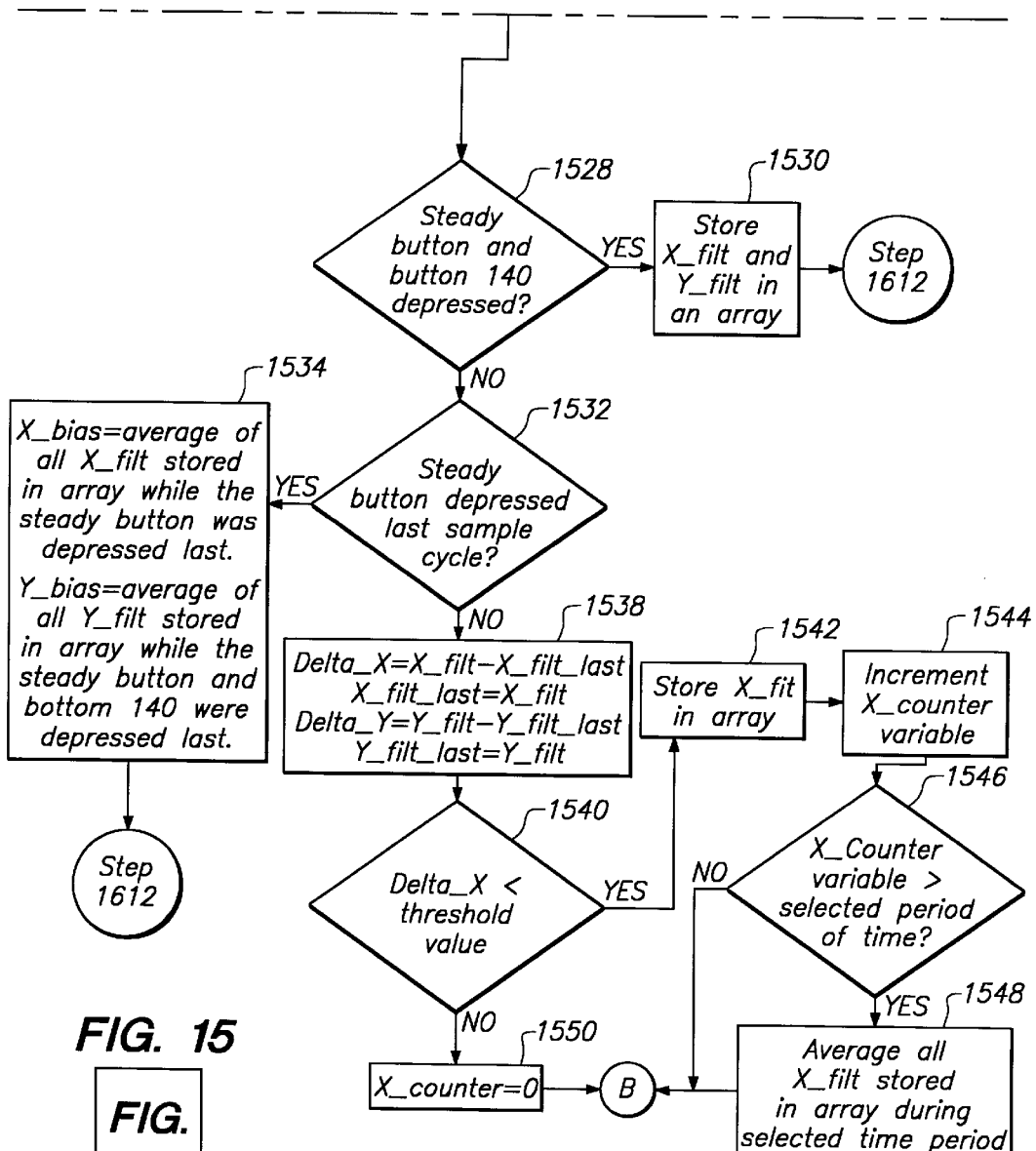
Figure 16:
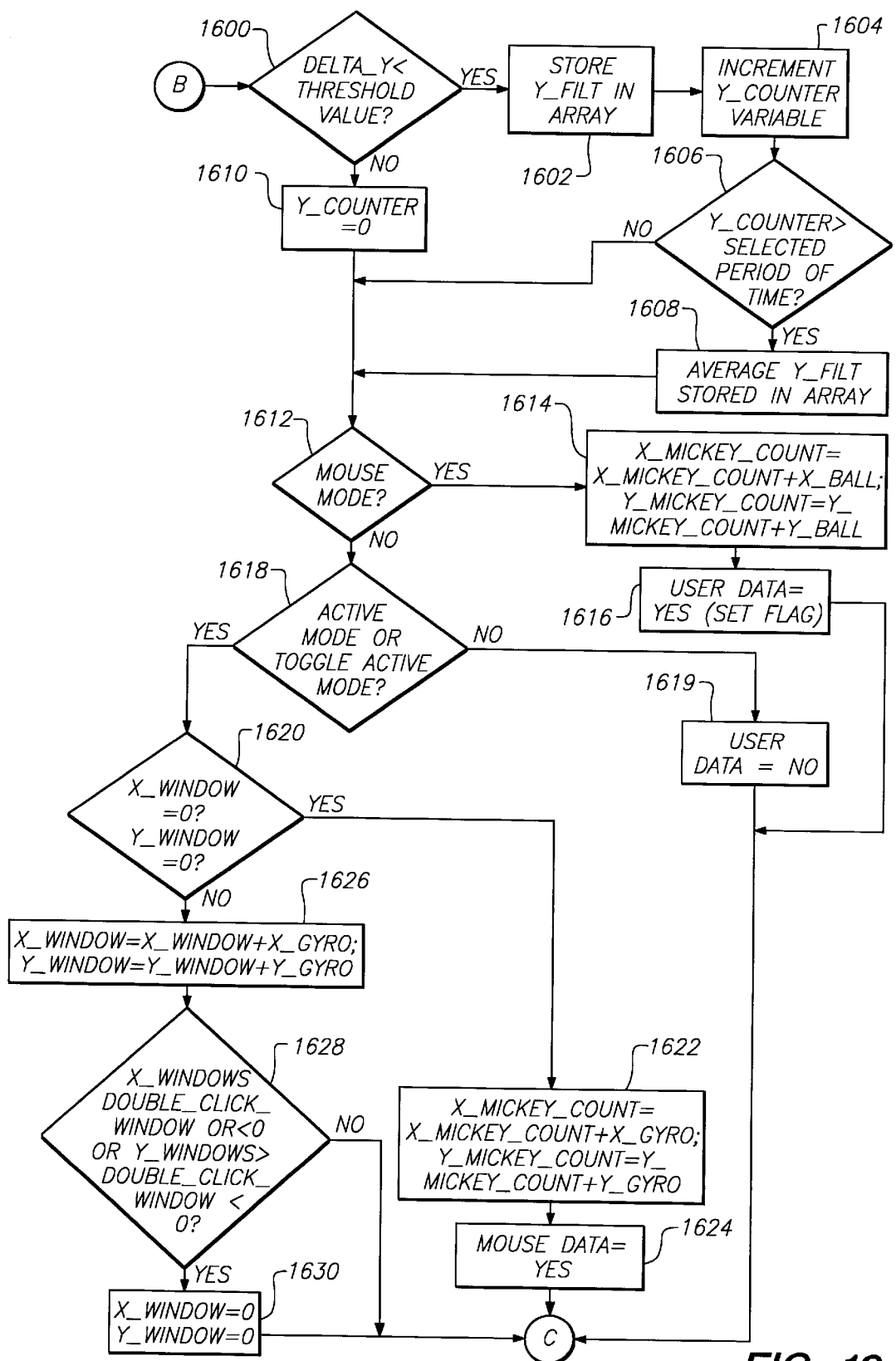
Figure 17:
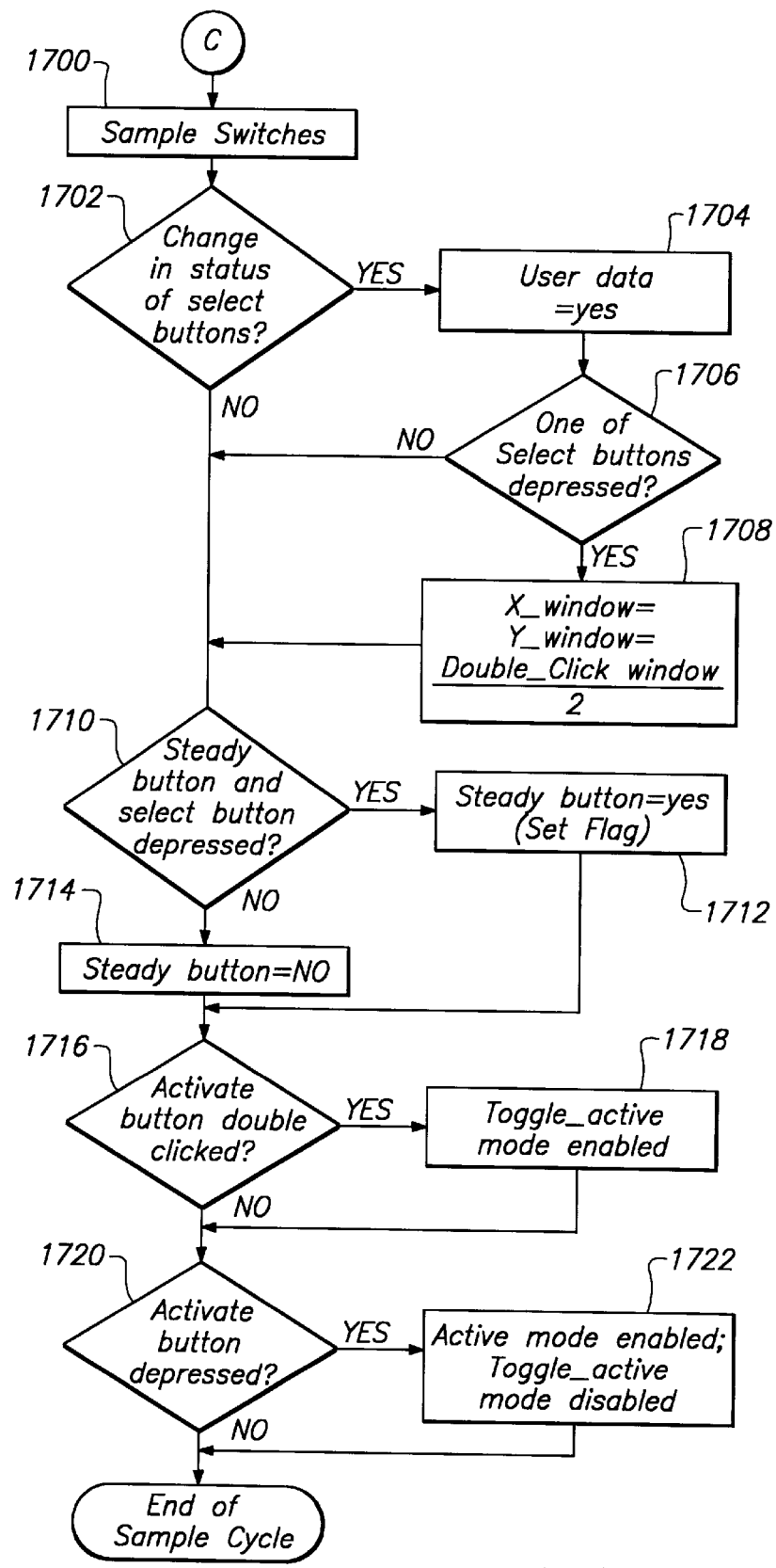

FIG. 13 illustrates the operation of the pointing apparatus with respect to a PS/2 computer. First, the microprocessor 930 decides 1300 whether user data needs be sent to the host computer, and, if user data needs be sent, it determines 1302, 1304 whether the PS/2 has conveyed the appropriate command allowing the pointing apparatus to send the user data. The PS/2 enables the pointing apparatus to send new user data by rendering both the clock line 948 and the data line 942 high. In response to these lines being high and new user data existing, the microprocessor transmits 1306 the user data to the computer and proceeds to step 1320. If the clock line 948 is high and the data line 942 is low, the microprocessor proceeds to step 1318. If the clock line 948 is low, the microprocessor proceeds to step 1308.

The microprocessor 930 ascertains 1308 whether data is currently being transmitted to the host computer. If so, the microprocessor 930 begins 1310 a sample cycle. Otherwise, the microprocessor 930 determines 1312 if the PS/2 is writing data, such as commands, to the microprocessor 930, and, if not, the clock and data lines 942, 948 are checked 1314, 1316 to ascertain whether or not the PS/2 needs to write data to the microprocessor 930. The PS/2 sets the clock line 948 high and the data line 942 low to indicate that it wants to write data, and the microprocessor 930 inputs 1318 data from the PS/2 in response. The microprocessor 930 again determines 1320 if data is currently being sent or inputted, and, in response to data being sent or inputted, the microprocessor 930 returns to step 1300. If data is not currently being sent or inputted, the microprocessor 930 decides 1322 whether any commands needs to be interpreted. If so, the microprocessor 930 interprets 1324 the commands and returns to step 1300. Otherwise, the microprocessor 930 determines 1326 whether user data exists. In response to the existence of user data, the microprocessor 930 determines 1328 whether the pointing apparatus 100 is enabled and in the PS/2 remote or stream modes, and, if so, prepares 1330 the user data for transmission in accordance with PS/2 protocol. The microprocessor 930 then begins 1332 another sample cycle and, subsequently, returns to step 1300.

With respect to FIGS. 14–17, a sample cycle, as performed by software running on the microprocessor 930, is described in detail. At the start of a sample cycle, the microprocessor 930 samples 1400 the outputs of the mouse ball encoders 467, 468. The underside of the pointing apparatus 100 substantially lies in a Cartesian plane defined by a x-axis and a y-axis, and one encoder output indicates rotation of the mouse ball 260 relative to the x-axis, while the other encoder output indicates rotation of the mouse ball 260 relative to the y-axis. The value of a software variable x_ball is set 1410 to correspond to the encoder output indicating motion relative to the x-axis, and the value of a software variable y_ball is set 1410 to correspond to the encoder output indicating motion relative to the y-axis. From the value of the x_ball and y_ball variables, the microprocessor 930 determines 1412 whether the mouse ball 260 has moved a threshold amount selected to indicate intentional movement of the pointing apparatus 100 on a surface. In one embodiment, mouse ball movement of more than half an inch indicates intentional movement of the pointing apparatus 100 on a surface. If the mouse ball 260 has moved the threshold amount, the microprocessor 930 identifies 1414 the pointing apparatus 100 as being in mouse mode.

After sampling the mouse ball encoders 467, 468, the microprocessor 930 determines 1416 whether a predetermined amount of time has elapsed since the last sample cycle. In one embodiment, the predetermined amount of time is six milliseconds. If the predetermined amount of time has not passed, the microprocessor 930 exits 1418 the sample cycle. Otherwise, the microprocessor 930 proceeds to sample the outputs of the gyroscopes, which correspond to yaw and pitch movement of the pointing apparatus 100. As discussed above, the microprocessor 930 receives filtered and digitized gyroscope outputs from the signal converter 920. After receiving the outputs, the microprocessor 930 filters 1420 them in software, where the cut off frequency is 15 Hz, and sets 1422 the values of software variables x_filt and y_filt to correspond to the filtered yaw and pitch outputs, respectively.

Generally, the gyroscope outputs indicate movement of gyroscopes. 810, 820 even when they are motionless. The output of a motionless gyroscope is known as a bias offset of the gyroscope, which can cause a cursor to drift across the computer screen with no intentional user movement of the pointing apparatus 100. To remedy this problem, microprocessor 930 zeroes out bias offsets in software. Specifically, the value of a variable, x_bias, corresponding to the bias offset of gyroscope 810, is subtracted 1424 from the value of x_filt, and the value of a variable y_bias, corresponding to the bias offset of gyroscope 820, is subtracted 1424 from the value of y_filt. New variable x_count is set 1424 to x_count plus the difference between x_filt and x_bias, and new variable y_count is set 1424 to y_count plus the difference between y_filt and y_bias. Therefore, variables x_count and y_count reflect leftover movement from the last sample cycle plus movement indicated by the filtered gyroscope outputs after the bias offset effects have been removed. Note that the accuracy of x_bias and y_bias depends on the frequent monitoring of the gyroscope outputs, and, thus, the microprocessor 930 samples the outputs of the gyroscopes 810, 820 even when the pointing apparatus 100 is in mouse mode.

The potential instability of the gyroscopes 810, 820 and the likely inability of a person to hold the pointing apparatus 100 absolutely motionless can result in the gyroscope outputs indicating movement where none is intended by a user, thereby causing cursor jitter. To remedy this, the microprocessor 930 only reports movement to the host computer if the pointing apparatus 100 has moved a minimum threshold amount in a single direction. Specifically, the microprocessor 930 determines 1500 whether the value of variable x_count indicates movement of less than the minimum threshold amount, and if so, sets 1502 the value of x_count to zero. Variable x_count reflects an integrated voltage value of the output of gyroscope 810, and, thus, x_count indicates movement of less than the threshold amount when the value of x_count is less than an integrated voltage value of an output (with the bias offset removed) of gyroscope 810 corresponding to the minimum threshold amount of movement. Variable x_count reflects a voltage value that is integrated because the gyroscope 810 is sampled at a constant rate. As shown in steps 1504 and 1506, the same method discussed with respect to x_count applies to y_count This method assumes that, if the gyroscope outputs indicate movement of less than the minimum threshold amount, the user did not intend to move the pointing apparatus 100, and, thus, the movement indicated should not be reported to the host computer. The minimum threshold amount of movement is smaller than that which can be perceived by the user. In one embodiment, the minimum threshold amount is two "mickeys", where a mickey is the smallest x or y movement reported to the computer.

If the value of x_count indicates movement greater than or equal to the minimum threshold amount of movement discussed above, the microprocessor 930 then determines 1508 whether the value of x_count reflects movement less than a larger, second threshold amount of movement. If so, x_count is set 1510 to x_count/2. Otherwise, the value of x_count remains unchanged. In steps 1512 and 1514, the same method applies to y_count. This method is intended to ease ability to zero in on an icon and provide the user with more control of cursor movement. It assumes that, if the pointing apparatus 100 moved less than the second threshold amount but at least as much as the first threshold amount discussed above, the user intended some movement, but not as much as the pointing apparatus 100 was actually moved. In one embodiment of the present invention, the second threshold amount is four mickeys.

Movement is reported to the host computer in terms of mickeys, and in steps 1516–1526 the microprocessor 930 calculates the number of mickeys to report from the values of x_count and y_count. Specifically, since x_count reflects an integrated voltage value of the output of gyroscope 810, x_count is compared 1516 to an integrated voltage value of an output (with the bias offset removed) of gyroscope 810 corresponding to movement of one mickey. If x_count is greater than the voltage value corresponding to movement of one mickey, variable x_gyro is set to x_count/(the voltage value corresponding to movement of one mickey), and x_count is set 1518 to the remainder. Otherwise, x_gyro is set 1520 to zero, and x_count remains the same. Similarly, in step 1522, y_count is compared 1522 an integrated voltage value of an output (with the bias offset removed) of gyroscope 820 corresponding to movement of one mickey. If y_count is greater than the voltage value corresponding to movement of one mickey, variable y_gyro is set 1524 to y_count/(the voltage value corresponding to movement of one mickey) and y_count is set to the remainder. Otherwise y_gyro is set 1526 to zero, and y_count remains the same. Since, at the beginning of a sample cycle, x_count is set to (x_count+x_filt−x_bias) and y_count is set to (y_count+y_filt−y_bias), the remainders are taken into account in the next sample cycle.

The values of variables x_bias and y_bias can be derived in two ways. One of the ways is for the user to set the values by simultaneously depressing the steady button 150 and the select button 140. The microprocessor 930 determines 1528 whether the steady button 150 and the select button 140 are simultaneously depressed, and, if so, it stores 1530 the values of x_filt and y_filt in a bias determination array within the microprocessor 930. If the steady button 150 and the select button 140 are not simultaneously depressed, the microprocessor 930 ascertains 1532 whether the steady button 150 and the select button 140 were simultaneously depressed in the last sample cycle. In response to these buttons having been simultaneously depressed in the last sample cycle, x_bias is set 1534 to the average of all the x_filt values stored in the bias determination array during the time in which the steady button 150 and the select button 140 were simultaneously depressed last and y_bias is set 1534 to the average of all y_filt values stored in the bias determination array during the time in which the steady button 150 and the select button 140 were simultaneously depressed last. In an alternate embodiment, only the steady button 150 need be depressed to set the values of x_bias and y_bias.

If the steady button 150 and the select button 140 are not simultaneously depressed or were not simultaneously depressed in the last sample cycle, the microprocessor 930 calculates the values of x_bias and y_bias for the next sample cycle from the current filtered outputs of the gyroscopes 810, 820 and from the previous filtered outputs of the gyroscopes 810, 820. With respect to x_bias, the microprocessor 930 determines 1538 the difference between x_filt and x_filt_last, where x_filt_last is equal to the previous value of x_filt in the previous sample cycle. The difference is then compared 1540 to a threshold value. If the difference is less than the threshold value, the microprocessor 930 stores 1542 the value of x_filt in the bias determination array and increments 1544 the value of variable x_counter. By comparing x_counter to a number representing a select period of time (e.g. three or four seconds), the microprocessor 930 then determines 1546 whether the difference between x_filt and x_filt_last has remained less than the threshold for the select period of time. If the difference has remained less than the threshold for the select period of time, then all x_filt values stored in the select period of time are averaged 1548 to determine the new x_bias. Conversely, with respect to the comparison in step 1540, if the difference between x_filt and x_filt_last is greater than the threshold, the counter variable is set 1550 to zero and the bias offset is not recalculated. As shown in steps 1600–1610, the same method, using y_filt and y_filt_last, applies to y_bias.

The method of bias calculation steps 1538–1610 assumes that a user would not be able to hold the pointing apparatus motionless for the select period of time in free space, and, therefore, any small movement detected within this time must be gyroscope drift while the pointing apparatus 100 rests on a surface. In practice, a steady handed user may reset the bias in free space, but only by deliberately holding the pointing apparatus 100 still. Consequently, if a user detects undesirable cursor drift while using the pointing apparatus 100, in addition to depressing the steady button 150 and the select button 140 simultaneously, the user may reset x_bias and y_bias by either setting the pointing apparatus 100 on a surface for the select amount of time or by holding the pointing apparatus 100 still for the same period of time.

After the x_bias and y_bias calculations, the microprocessor 930 determines 1612 whether the mouse mode flag is set. If so, variable x_ball is added 1614 to variable x_mickey_count, and variable y_ball is added to a variable y_mickey_count. The microprocessor then sets 1616 a flag indicating that user data exists and proceeds to step 1700 to sample the switches.

The variables x_mickey_count and y_mickey_count represents the amount a display or a displayed cursor should be moved in the x and y directions, respectively, since movement was last reported to the host computer. The movement is relative to the current position of the display or the displayed cursor on a computer-controlled display screen substantially lying in a Cartesian plane defined by an x-axis and a y-axis. Each time movement is reported to the host computer, x_mickey_count and y_mickey_count are set to zero.

In response to the pointing apparatus 100 not being in mouse mode, the microprocessor 930 determines 1618 whether the pointing apparatus 100 is in free space mode. The pointing apparatus 100 is in free space mode when a user has double clicked or is depressing the activate button while the pointing apparatus 100 is not in mouse mode. If the pointing apparatus 100 is not in free space mode, the microprocessor 930 recognizes 1619 that no user data currently exists and proceeds to step 1700 to sample the switches 980, 982, 984, 986. Otherwise, the microprocessor 930 determines whether the movement indicated by variables x_gyro and y_gyro should be reported to the host computer.

In many computer operating systems, a user initiates an operation by rapidly double clicking one of the select buttons while the cursor is over an icon symbolizing the operation. Additionally, a user drags an icon by clicking once on the icon and moving the pointing apparatus while still holding down the select button. When the pointing apparatus 100 operates in free space, a user intending to double click on an icon may unintentionally move the pointing apparatus 100 between clicks, causing the icon to be dragged instead of being double clicked. The microprocessor 930 remedies this problem in steps 1620–1630, specifically by not reporting any movement less than a threshold amount in a single direction in response to a user depressing one of the select buttons in the free space mode. In one embodiment, the threshold amount of movement is four mickeys, which is typically more than a user's unintentional movement, yet less than what can be perceived.

In step 1620, the microprocessor determines whether both variables x_window and y_window are zero. If they are zero, x_gyro and y_gyro, which represent the free space movement of the pointing apparatus 100, are added 1622 to x_mickey_count and y_mickey_count, respectively. The microprocessor 930 then sets 1624 a flag indicating that user data exists and proceeds to sample the switches (step 1700).

Variables x_window and y_window are both set to zero when the microprocessor 930 initializes variables upon power up, and they will remain zero until the select button is pushed. As discussed below, if one of the select buttons is depressed, x_window and y_window are both set to half the value of variable double_click_window. Variable double_click_window defines the upper limit of a window, where when x_window is within the window, one of the select buttons has been depressed and the pointing apparatus 100 has not moved the threshold amount in the x direction. The lower limit of the window is zero. If x_window is outside the window, x_window is set to zero. The same applies for y_window with respect to the y direction.

If either x_window or y_window is unequal to zero, x_window is incremented 1626 by x_gyro and y_window is incremented 1626 by y_gyro. The microprocessor 930 then determines 1628 if the value of x_window is less than zero or greater than the value of double_click_window or if y_window is less than zero or greater than the value of double_click_window. The condition in step 1628 will be satisfied if the pointing apparatus 100 has moved the threshold amount required. If the condition is satisfied, both x_window and y_window are set 1630 to zero so that in the next sample cycle the condition in step 1620 will be satisfied and the movement indicated by x_gyro and y_gyro will be reported to the computer. If the condition in step 1628 is not satisfied, the pointing apparatus 100 has not moved the threshold amount, and, thus, the values of x_window and y_window remain the same and no free space movement will be reported to the computer in the next sample cycle.

In an alternative embodiment, the microprocessor 930 uses a conventional timer instead of performing steps 1626–1630. In this embodiment, the microprocessor cancels out movement occurring in a fixed amount of time, such as half a second, after a select button is depressed.

In step 1700, microprocessor 930 samples 1700 switches 980, 982, 984, 986 which are each manually actuated by one of the select, activate and steady buttons 130, 140, 150, 160. The microprocessor 930 determines 1702 whether there has been a change in status in any of the select buttons. In response to there being a change in status, the microprocessor recognizes 1704 that user data exists and then checks 1706 if a user has depressed one of the select buttons. If a user has depressed one of the select buttons, x_window and y_window are equated 1708 with double_click_window/2.

The microprocessor 930 determines 1710 whether the steady button and button 140 have been simultaneously depressed. In response to these buttons being simultaneously depressed, the microprocessor 930 sets 1712 a flag indicating as much. Conversely, if these buttons are not simultaneously depressed, the microprocessor 930 ensures 1714 that the steady button flag is not set.

The microprocessor 930 then ascertains 1716 whether the activate button 130 has been double clicked. In response to the activate button 130 having been double clicked, the microprocessor 930 enables 1718 the toggle activate mode, which provides for cursor tracking without the need to hold down the activate button 130. The microprocessor 930 then determines 1720 whether the activate button 130 has been depressed. If the activate button 130 is depressed, the microprocessor 930 enables 1722 the active mode, which allows for cursor tracking while the activate button 130 is depressed, and disables 1722 the toggle-active mode. This completes a sample cycle.

Figure 18:
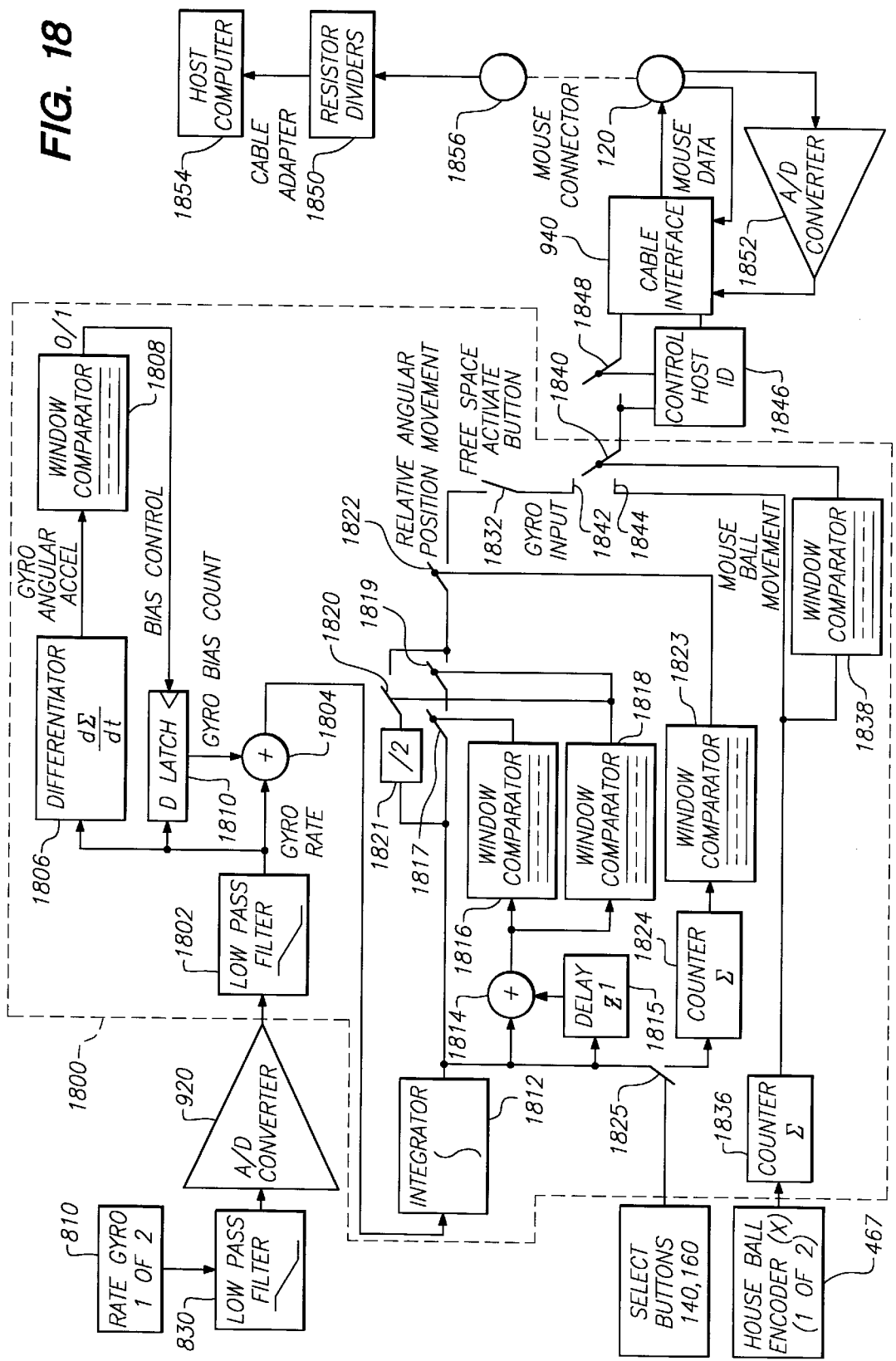
FIG. 18 is a block diagram illustrating a signal flow through an alternate embodiment of the present invention.

Although software performs the functions in steps 1400–1722 of the flow chart described above, these functions can be performed by hardware components in a another embodiment of the present invention. FIG. 18 illustrates signal flow through the pointing apparatus 100 when hardware components are used for these steps. Functions of the components in area 1800 are those performed in software in steps 1400–1722.

Data indicative of free space movement originates with the rate gyroscopes 810 and 820. Only one gyroscope 810 is shown in FIG. 18 for simplicity, but the signal flow for the other gyroscope 820 is identical. The output of gyroscope 810 provides an output signal voltage proportional to the rate of angular rotation of the pointing apparatus 100.

As discussed above, the output of gyroscope 810 is passed to low pass filter 830 with a cut off frequency of approximately sixty hertz (Hz) and then to A/D converter 920, which converts the analog output to a number between zero and 4095. After the A/D converter, a low pass filter 1802 with a cut off frequency of about fifteen hertz filters the gyroscope output signal again.

A conventional adder 1804 then subtracts an estimate of the gyroscope bias, stored in a latch 1810, from the filtered gyroscope output. Components 1806, 1808 and 1810 represent the bias estimation section of the flow chart. A conventional differentiator 1806 receives the gyroscope output and calculates the angular acceleration of the pointing apparatus 100. Subsequently, a conventional window comparator 1808 ascertains whether the angular acceleration is within a specified window. If the angular acceleration remains within the specified window of the comparator 1808 for a select period of time, such as four seconds, the pointing apparatus 100 is assumed to be motionless, and the current value of the filtered gyroscope output is then stored in the conventional latch 1810 as the new estimate of the gyroscope bias.

After the bias is eliminated from the gyroscope output, a conventional integrator 1812 integrates the gyroscope output so that the integrated gyroscope output indicates movement in terms of mickeys. If the gyroscope output signal represents movement deemed to be unintentional movement of the gyroscope 810, components 1814–1817 prevent the signal from being reported to the host computer. Specifically, a conventional adder 1814 subtracts the current value of the signal from the previous value of the signal, which is temporarily delayed by a delay 1815. Delay 1815 may be a conventional shift register. A conventional window comparator 1816 determines whether the difference between the current signal value and the previous signal value lies within a first predetermined window, which, according to one embodiment, is between zero and two mickeys in terms of movement. If the difference is within the window, a conventional switch 1817 remains open and the output of the integrator 1812 is not passed to the cable interface 940. Conversely, if the difference is outside the window, the switch 1817 doses, and the output travels to switch 1819.

At substantially the same time as window comparator 1816 determines whether the difference between the current signal value and the previous signal value lies within the first predetermined window, conventional window comparator 1818 determines whether the difference between the signal values lies within a second predetermined window. According to one embodiment, the second predetermined window is between two and four mickeys in terms of movements. If the difference is within the second predetermined window, conventional switch 1819, normally closed, opens and conventional switch 1820, normally open, closes. The gyroscope output signal is then supplied to a conventional divider 1821, which cuts the signal value in half. From divider 1821, the integrated gyroscope output signal travels to conventional switch 1822.

Components 1822–1825 perform the double click functions of steps 1620–1630 in the above-described flow chart. Specifically, when one of the select buttons 140, 160 is depressed, conventional switch 1825 opens and closes, causing conventional counter 1824 to reset and causing switch 1822, normally closed, to open. Switch 1822 remains open until the output of counter 1824 is outside a third predetermined window, as determined by conventional window comparator 1823. According to one embodiment, the third predetermined window is between zero and four mickeys in terms of movement. This method assumes that once the output of counter 1824 is outside the third predetermined window, the user has moved the pointing apparatus enough to indicate intentional movement, despite having depressed one of the select buttons.

If the integrates gyroscope output signal reaches conventional switch 1832 and conventional switch 1832 is dosed, the signal travels to the cable interface 940. Switch 1832 doses when a user double-clicks or depresses the activate button 130.

Data indicative of mouse ball movement originates with mouse ball encoders 467 and 468, which generate signals proportional to the movement of the mouse ball 260. For simplicity, FIG. 18 only illustrates one encoder 467, but the signal flow from the other encoder 468 is identical. A conventional counter 1836 receives the encoder 467 output and, from the output generates a signal representative of movement in terms of mickeys.

A conventional window comparator 1838 then determines whether the value of the counter 1836 output is within a specified window. If so, a conventional switch 1840, normally closed at position 1842, remains in position 1842 and the counter output does not proceed to the cable interface 940. Otherwise, the switch 1840 closes at position 1844, thereby allowing the counter 1836 output to pass to the cable interface 940 while inhibiting the gyroscope output from doing so. In one embodiment of the present invention, the window is set such that the counter output must indicate mouse ball movement of at least half an inch to proceed to the cable interface 940.

A controller 1846, such as the microprocessor 930, controls the flow of data to the cable interface 940. It performs the host identification, Apple loop, PS-2/CD-I loop, and PC loop functions described in steps 1002–1332. When data from the mouse encoders 467, 468 or the gyroscopes 810, 820 should be sent to the host computer, the controller 1846 doses a conventional switch 1848, allowing the data to travel to the cable interface 940.

From the cable interface 940, data travels to the host computer 1854 through the mouse connector cable 120 and, if used, through an adapter or serial port cable 1856 having resistor dividers 1866. Data traveling from the host computer 1854 to the cable interface is interpreted by the controller 1846. The computer identification data traveling on the host ID and RTS lines 944, 946 is digitized by an A/D converter 1852 before being received at the controller 1846.

Therefore, the pointing apparatus of the present invention operates in either free space or on a surface to maximize a user's ability to control cursor movement and select elements on a computer screen while minimizing unintentional cursor movement.

What is claimed is:

1. A method for generating movement data indicative of a direction and a distance a display or a displayed cursor on a computer-controlled display screen is to be moved in response to movement of a pointing apparatus, wherein the pointing apparatus includes a gyroscopic element, the method comprising the steps of:
    sampling an output of the gyroscopic element, the output indicating movement of the pointing apparatus;
    generating the movement data from the sampled output;
    determining whether the movement data indicates that the pointing apparatus has moved at least a first threshold amount;
    in response to the movement data indicating that the pointing apparatus has not moved at least the first threshold amount, altering the movement data to indicate that the pointing apparatus has not moved; and
    in response to the movement data indicating that the pointing apparatus has moved at least the first threshold amount, determining whether the movement data indicates that the pointing apparatus has moved at least a second threshold amount; and
    in response to determining that the movement data indicates that the pointing apparatus has not moved at least the second threshold amount, reducing an amount of movement indicated by the movement data.

2. The method of claim 1, wherein an amount of movement between the first threshold amount and the second threshold amount is selected to represent partially intentional movement and partially unintentional movement.

3. The method of claim 1, wherein the first threshold amount is an amount of movement selected to represent at least partially intentional movement of the pointing apparatus.

4. The method of claim 1, wherein, before the determining step, the method further comprises the step of removing effects of a bias offset of the gyroscopic element element from the movement data.

5. The method of claim 4 further comprising the step of selectively determining the bias offset from the sampled output and from previous sampled outputs of the gyroscopic element.

6. A method for generating movement data indicative of a direction and a distance a display or a displayed cursor on a computer-controlled display screen is to be moved in response to movement of a pointing apparatus, wherein the pointing apparatus includes a gyroscopic element, the method comprising:
    sampling an output of the gyroscopic element, the output indicating movement of the pointing apparatus;
    generating the movement data from the sampled output;
    determining a difference between a value of the sampled gyroscopic element output and a value of a previously sampled gyroscopic element output in a previous sample cycle;
    determining whether the difference is at least as large as a first threshold amount;
    in response to the difference not being at least as large as the first threshold amount, determining a period of time for which the difference between values of successive sampled outputs of the gyroscopic element has not been at least as large as the first threshold amount;
    in response to the period being greater than a select amount, determining the bias offset of the gyroscopic element from an average of all sampled outputs of the gyroscopic element generated in the period of time; and
    removing effects of the bias offset from the movement data.

7. The method of claim 6, wherein the first threshold amount is an amount of movement selected to represent intentional movement of the pointing apparatus between a current sample cycle and the previous sample cycle.

8. A method for generating movement data indicative of a direction and a distance a display or displayed cursor on a computer-controlled display screen is to be moved in response to movement of a pointing apparatus, wherein the pointing apparatus includes a gyroscopic element, the method comprising:
    sampling an output of the gyroscopic element, the output indicating movement of the pointing apparatus;
    generating the movement data from the sampled output;
    determining whether a user of the pointing apparatus has selected an element on the computer-controlled display screen;

in response to the user selecting an element on the computer-controlled display screen, determining whether the movement data indicates that the pointing apparatus has moved at least a first threshold amount; and in response to the movement data not indicating that the pointing apparatus has moved at least the first threshold amount, altering the movement data to indicate that the pointing apparatus has not moved.

9. The method of claim 8, wherein the first threshold amount is an amount of movement selected to represent intentional movement of the pointing apparatus by the user after selecting the element.

10. The method of claim 1 further comprising the steps of:

selectively inhibiting the pointing apparatus from sending the movement data to a computer to permit reorientation of the pointing apparatus without movement of the display or the displayed cursor; and selectively enabling the pointing apparatus to send the movement data to the computer.

\* \* \* \* \*